United States Patent
Rastogi

(10) Patent No.: US 11,727,009 B2
(45) Date of Patent: Aug. 15, 2023

(54) SYSTEM AND METHOD FOR PROCESSING SKEWED DATASETS

(71) Applicant: HCL Technologies Limited, New Delhi (IN)

(72) Inventor: Avnish Kumar Rastogi, Noida (IN)

( * ) Notice: Subject to any disclaimer, the term of this patent is extended or adjusted under 35 U.S.C. 154(b) by 301 days.

(21) Appl. No.: 17/036,644

(22) Filed: Sep. 29, 2020

(65) Prior Publication Data

US 2022/0100752 A1    Mar. 31, 2022

(51) Int. Cl.
*G06F 16/00*     (2019.01)
*G06F 16/2455*   (2019.01)
*G06F 9/54*      (2006.01)

(52) U.S. Cl.
CPC .......... *G06F 16/2456* (2019.01); *G06F 9/542* (2013.01)

(58) Field of Classification Search
CPC ................. G06F 16/217; G06F 16/211; G06F 16/24542; G06F 16/2282; G06N 3/04; G06N 3/088; G06N 3/006; G06N 3/08
See application file for complete search history.

(56) References Cited

U.S. PATENT DOCUMENTS

| | | | |
|---|---|---|---|
| 5,987,468 A | 11/1999 | Singh et al. | |
| 9,594,580 B2* | 3/2017 | Runkis | H04L 9/065 |
| 11,086,545 B1* | 8/2021 | Dayal | G06F 11/1435 |
| 2014/0379692 A1* | 12/2014 | Teletia | G06F 16/278 |
| | | | 707/714 |
| 2016/0117354 A1 | 4/2016 | Schreter | |
| 2019/0325043 A1* | 10/2019 | Liao | G06F 16/178 |

FOREIGN PATENT DOCUMENTS

JP          5244559 B2    10/2014

* cited by examiner

*Primary Examiner* — Vincent F Boccio

(57) ABSTRACT

Disclosed is a method and system for processing skewed datasets. The processor 202 is configured to capture a broadcast size of non-skewed datasets to be loaded onto a memory associated with one or more nodes in a distributed system. The skewed dataset is identified from two or more datasets to be joined. Each of the non-skewed dataset is divided into a plurality of non-skewed data chunks at the node and each of the non-skewed data chunk is broadcasted to one or more nodes having the skewed dataset. The joining operation is then performed between each of the skewed dataset and the non-skewed data chunk till all the non-skewed data chunks are consumed in the join operation. Resultant joined dataset is then collected as a single joined dataset from the nodes involved in the joining operation.

10 Claims, 4 Drawing Sheets

SYSTEM AND METHOD FOR PROCESSING SKEWED DATASETS

TECHNICAL FIELD

The present subject matter described herein, in general, relates to datasets, and more particularly to a system and method for processing skewed datasets in a distributed computing environment.

BACKGROUND

In massively parallel processing system or distributed enterprise data warehouses, applications process massive amount of data. The massive amount of data is stored in datasets. To store a dataset on a distributed warehouse, the dataset is broken into small sizeable and manageable chunks and stored on different machines thereby forming a cluster.

Various data processing requirements may require data from one dataset to be enriched with the data from another different dataset. A look up is performed on the basis of one or more than one attributes which are present in both the datasets. The operation of look up is called as a join operation.

However, there may be a problem where the distribution of the data for one of the datasets especially the larger datasets amongst the datasets to be joined, on the basis of joining keys (attributes) is heavily skewed. In distributed computing, skewness in data causes all the records for the dataset to be shuffled and moved to one set of machines as joining the records belonging to a particular key(s) is the responsibility of that node. Since the dataset is very large in size and is heavily skewed, the process of enriching the data becomes inefficient, takes very long time, causing the resources of the data warehouse to be unavailable for use by other workloads.

SUMMARY

Before the present system and method for processing skewed datasets in a distributed computing environment are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application.

This summary is provided to introduce aspects related to a system and method for processing skewed datasets. This summary is not intended to identify essential features of the claimed processing of skewed dataset. The subject matter is not intended for use in determining or limiting the scope of the claimed subject t matter.

In one implementation, a system for processing skewed datasets is disclosed. In one aspect, the system comprises a memory, and a processor coupled to the memory. Further, the processor may be capable of executing instructions in the memory to perform one or more steps described now. Further, the processor is configured to capture a broadcast size of non-skewed datasets to be loaded onto a memory associated with one or more nodes in a distributed system. Further, the processor is configured to identify a skewed dataset from two or more datasets to be joined at a node. Further, the dataset comprises at least one of a non-skewed dataset and the skewed dataset. Further the processor is configured to divide each of the non-skewed dataset into a plurality of non-skewed data chunks at the node. Each of the non-skewed data chunk comprises a broadcast size chunk and the broadcast size defines a maximum size of the non-skewed data chunk. Further, the processor is configured to broadcast, each of the non-skewed data chunk to one or more nodes/machines involved in the join operation. The one or more nodes are used for performing joining operation of the two or more datasets. The processor is configured to perform the joining operation over each of the node between each of the skewed dataset and the non-skewed data chunk received as a result of the broadcasting, for obtaining a resultant joined dataset. Further the processor is configured to store, each of the resultant joined dataset over each of the node. Each of the broadcasting and the performing of the joining operation are repeated till a last non-skewed data chunk of one or more non-skewed datasets is joined with the skewed dataset. Further, the processor collects the resultant joined dataset as a single dataset, from the nodes involved in the joining operation.

In another implementation, a method for processing skewed datasets is disclosed. In one aspect, the processor performs capturing of a broadcast size of non-skewed datasets to be loaded onto a memory associated with one or more nodes in a distributed system. Further, the processor performs identifying, at a node, a skewed dataset from two or more datasets to be joined. The dataset comprises at least one of a non-skewed datasets and the skewed dataset. Further the processor performs dividing, at the node, each of the non-skewed dataset into a plurality of non-skewed data chunks. Further, each of the non-skewed data chunk comprises a broadcast size chunk where the broadcast size defines the maximum size of the non-skewed data chunk. The processor performs the broadcasting, at each of the nodes, each of the non-skewed data chunk to one or more nodes having the skewed dataset. Further the one or more nodes are used for performing joining operation of the two or more datasets. The processor performs, over each of the node, the joining operation between each of the skewed dataset and the non-skewed data chunk received as a result of the broadcasting, for obtaining a resultant joined dataset. Further the processor stores, each of the resultant joined dataset at each of the node. Each of the broadcasting and the performing of the joining operation are repeated till all the non-skewed data chunks are joined with the skewed dataset. Further, the processor collects the resultant joined dataset as a single dataset, from the nodes involved in the joining operation.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now he discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for processing skewed datasets, similar or equivalent to those described herein can be used in the practice or testing of embodiments of the present disclosure, the exemplary, processing skewed datasets are now described. The disclosed embodiments for processing skewed datasets are merely examples of the disclosure, which may be embodied in various forms.

Various modifications to the embodiment will be readily apparent to those skilled in the art and the generic principles herein may be applied to other embodiments for processing skewed datasets. However, one of ordinary skill in the art will readily recognize that the present disclosure for processing skewed datasets is not intended to be limited to the embodiments described, but is to be accorded the widest scope consistent with the principles and features described herein.

Generally, there may be a problem where the distribution of the data for one of the datasets especially the larger datasets amongst the datasets to be joined, on the basis of joining keys/attributes is heavily skewed. This skew cause all the records for this dataset to be shuffled and moved to one set of machines as joining the records belonging to this key(s) is the responsibility of that node. Since the dataset is heavily skewed, the process of enriching the data by join operation becomes inefficient, takes very long time and at times takes forever or is stuck, causing the resources of the data warehouse to be unavailable for use by other workloads, This invention proposes a computer-based system which solves the above problem and handles data skew efficiently. The present subject matter overcomes a problem of a data skew by providing a system and method for processing skewed datasets.

Figure 1:
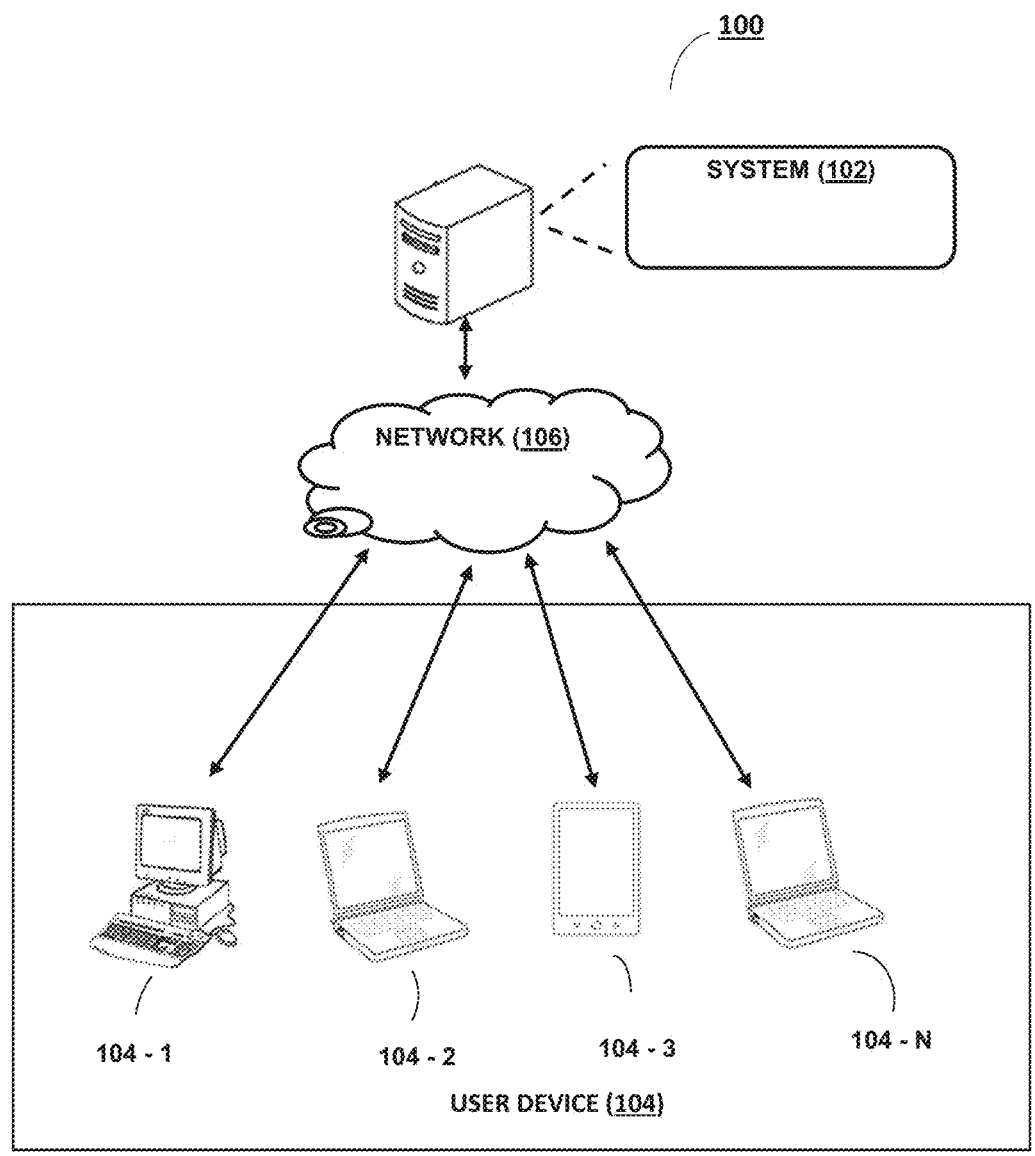
FIG. 1 illustrates a network implementation 100 of a system 102 for processing skewed datasets, in accordance with an embodiment of the present subject matter

Referring now to FIG. 1, a network implementation 100 of a system 102 for processing skewed datasets, in accordance with an embodiment of the present subject matter may be described. In one example, the system 102 may be connected with mobile devices 104-1 through 104-N (collectively referred as 104) through a communication network 106.

It should be understood that the system 102 and the mobile devices 104 correspond to computing devices. It may be understood that the system 102 may also be implemented in a variety of computing systems, such as a laptop computer, a desktop computer, a notebook, a workstation, a mainframe computer, a server, a network server, a cloud-based computing environment, or a smart phone and the like. It may be understood that the mobile devices 104 may correspond to a variety of portable computing devices, such as a laptop computer, a desktop computer, a notebook, a smart phone, a tablet, a phablet, and the like.

In one implementation, the communication network 106 may be a wireless network, a. wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

Figure 2:
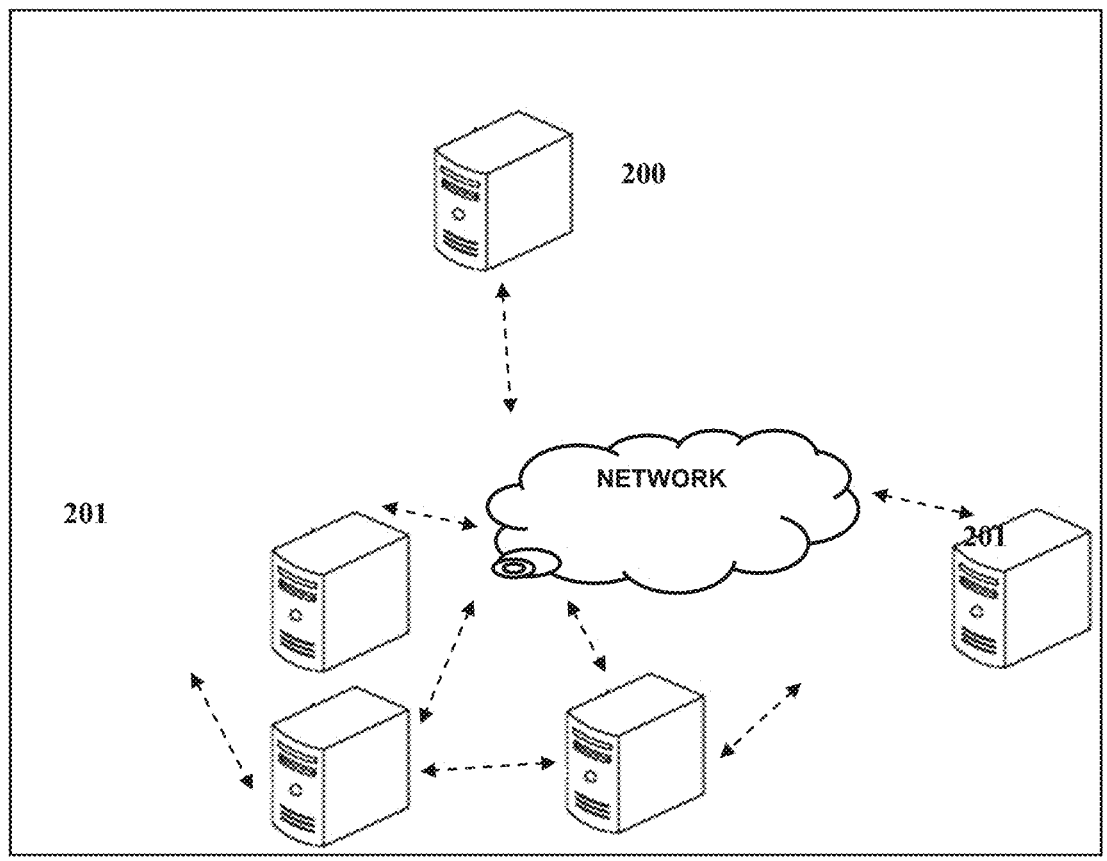
FIG. 2 illustrates an architecture diagram showing plurality of nodes within the system 102, in accordance with an embodiment of the present subject matter

Referring now to FIG. 2, a block diagram of the system 102 is illustrated in accordance with an embodiment of the present subject matter. In one embodiment, the system 102 may include a group of machines 201, where one machine is connected to other machine through a communication network through a central server 200. The network may include one of Wide Area Network (WAN) or a Local Area Network (LAN). The cluster of machines may be hosted or placed at a similar physical location or may be placed across different geographical regions. The cluster of machines (computing devices) may be specialized computing hardware or a group of desktop machines or workstations etc., connected to one another using the communication network. In one embodiment, the system 102 may use open source distribution of Hadoop to distribute and store data across the cluster of nodes.

In one of the embodiments, the datasets are distributed across the cluster of machines and are stored in the cluster of machines. The distribution of the datasets across the cluster of machines uses any of the established data partitioning techniques.

Figure 3:
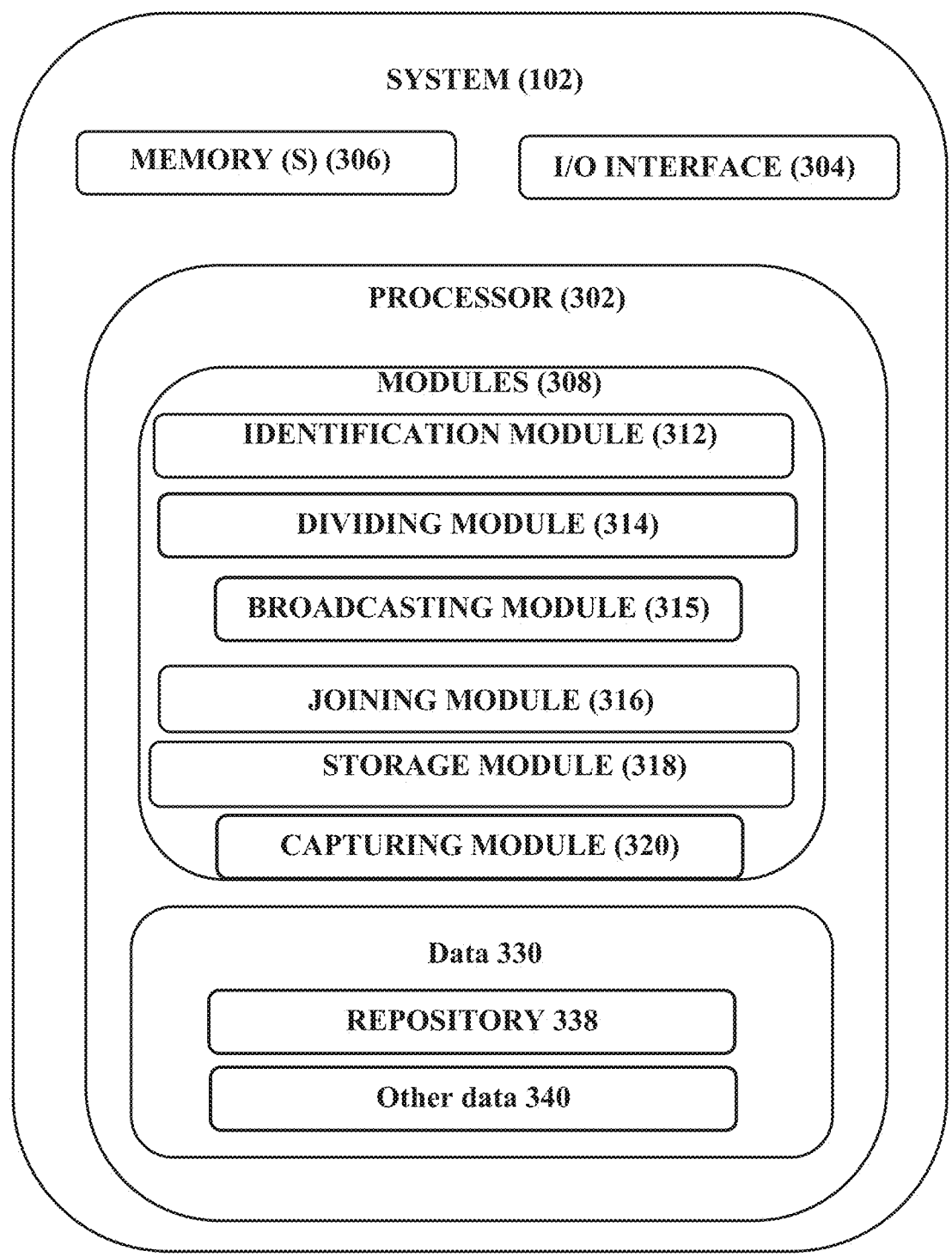
FIG. 3 illustrates a block level diagram of the system 102, in accordance with an embodiment of the present subject matter.

Referring now to FIG. 3. a block diagram 300 of the system 102 is illustrated in accordance with an embodiment of the present subject matter. In one embodiment, the system 102 may include at least one processor 302, an input/output (I/O) interface 304, and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, at least one processor 302 may be configured to fetch and execute computer-readable instructions stored in the memory 306.

The I/O interface 304 may include a variety of software and hardware interfaces, for example, a web interface, a graphical user interface, a command line interface, and the like. The I/O interface 304 may allow a user to interact with the system 102. Further, the I/O interface 304 may enable the system 102 to communicate with the mobile devices 104, and other computing devices, such as web servers and external data servers (not shown). The 110 interface 304 can facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306, amongst other things, serves as a repository for storing data processed, received, and generated by one or more of modules 308. The memory 306 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 306 may include data generated as a result of the execution of one or more of the modules 308. The memory 306 is connected to a plurality of modules 308. The system 102 comprises an identification module 312, dividing module 314, a joining module 316, a storage module 318 and a capturing module 320.

The data 330 may include a repository 338 for storing data processed, computed, received, and generated by one or more of the modules 308. Furthermore, the data 310 may include other data 340 for storing data generated as a result of the execution of modules than the ones mentioned above.

In one implementation, for processing skewed datasets in a distributed computing environment, the processor 302 may identify a skewed dataset, at a node, from two or more datasets to be joined. A node is a machine which forms part of a cluster of machines where the data is being processed. The dataset comprises at least one of a non-skewed datasets and the skewed dataset. The dataset is considered to be skewed if there are a disproportionately large number of records against one or more than one set of join keys. The join operation usually requires the two datasets to be joined on one or more than one attributes common to both the datasets. Join key here refers to the attributes on which the join operation is executed. The skewed dataset is a larger dataset in a set of two datasets to be joined.

In an exemplary embodiment, a join operation between two datasets i.e., one dataset denoting the "world census" dataset and the other dataset comprising the "language spoken in a region of the world" dataset may be considered. The join may be performed on "region/country" key. In this example, the census dataset is heavily skewed towards countries like China and India. For performing a join operation, the language spoken dataset is split into "broadcast" chunks and each chunk broadcasted to all the machines involved in the join operation. The join between the "census" dataset and the "language spoken" dataset is performed and after the successful join operation the next chunk of the "language spoken" dataset is broadcasted. The broadcast of a chunk to all the machines performing the join operation and the join operation is repeated till all the "broadcast" chunks of the "language spoken" dataset is exhausted. The final resultant joined dataset is one of an aggregation or union of all the individual join output obtained in each of the steps.

A skewed dataset may be identified by various established mathematical methods. In one such method, skew may be identified by calculating the deviation of the number of records present against a key from the mean of the number of records per distinct join keys.

Further, the datasets that are processed by the processor 302 are very large and are processed in a distributed way. The datasets are usually partitioned and stored on a cluster of machines. The processor 302 may divide, each of the non-skewed dataset into a plurality of non-skewed data chunks at the node. Each of the non-skewed data chunk comprises a broadcast size chunk. The broadcast size defines a maximum size of the non-skewed data chunk that can be broadcasted/sent to all the other nodes involved in the join operation.

The processor 302 is configured with the maximum size in bytes of a dataset chunk that may be transmitted to each of the machines/nodes involved in the join operation. The configuration parameter can be referred to as broadcast size. The broadcast size may be configured using a configuration file or another computer-based system. Further the processor 302 is configured to divide each of the non-skewed dataset into a plurality of non-skewed data, chunks.

Further, the processor 302 at the node having the non-skewed dataset is configured to broadcast each of the non-skewed data chunk to one or more nodes. The one or more nodes are used for performing joining operation of the two or more datasets. The broadcasting of a dataset comprises one of a serializing each of the non-skewed data chunks, sending the serialized data chunk to each of the nodes involved in the join operation and deserializing each of the non-skewed data chunks received on each of the other nodes. The processor 302 may use any of the available serializing and deserializing techniques.

Further, the processor 302 performs the joining operation between each of the skewed dataset and the non-skewed data chunk received as a result of the broadcasting over each of the node. The join operation is executed between the non-skewed data chunk broadcasted to all the nodes and the skewed dataset partition each node owns.

The processor 302 broadcasts the chunk of data to all the nodes (involved in operation of joining) to ensure that the non-skewed data chunk is available on each of the nodes involved in the join operation. The broadcast operation ensures that the data is joined on each of the nodes (computing nodes) locally.

Further the processor 302 stores, each of the resultant fined dataset over each of the node.

Further, the processor 302 repeats each of the broadcasting and the performing of the joining operation till a last skewed dataset of one or more skewed datasets is joined with the non-skewed data chunk.

Further, the processor 302 collects the resultant joined dataset as a single joined dataset from the nodes involved in the joining operation.

In one embodiment, the processor 302 is configured to detect the skewed dataset based on data distribution on joining keys used for joining the two or more datasets. The data distribution is calculated by using one of a predefined methodology.

In one embodiment, the processor 302 is configured to capture, a broadcast size of thee non-skewed datasets to be loaded onto a memory associated with one or more nodes in the distribution system. The broadcast size is captured from at least one of configuration file, or command line option or another computer-based system with a graphical user interface.

The broadcast size is the maximum number of records or the size in bytes of the data. that can be transferred from one node to all the other nodes in the cluster. The broadcast size depends on the various parameters like the memory configuration (RAM) of the machine processing the data and the number of datasets involved in the join operation. If the node processing the data has less available memory, a smaller broadcast size may be provided. In case, if the nodes processing the data have higher memory configuration, a larger broadcast size may be used.

With more than one non-skewed datasets involved in a join operation, the number of records that may be broadcasted i.e. transferred to all the individual nodes involved in the join operation shall be lesser, compared to when only one non-skewed dataset is involved in the join operation as each node would need to accommodate the broadcasted chunks of all the datasets in memory. The broadcast size hence can be tuned iteratively, and the best size used which optimizes join processing.

Figure 4:
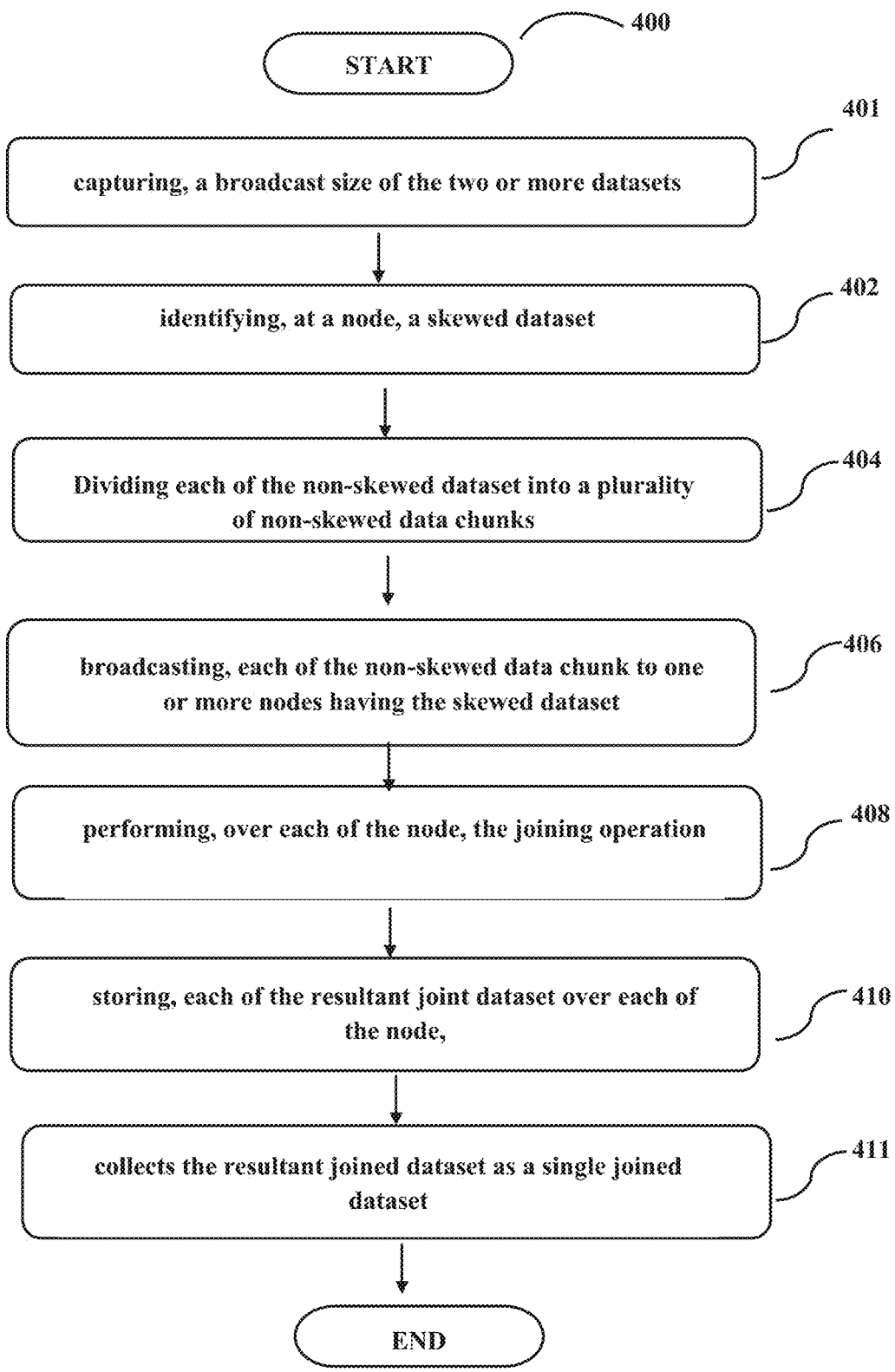
FIG. 4 illustrates a method 300 for processing skewed datasets, in accordance with an embodiment of the present subject matter.

Referring now to FIG. 4, a method 400 for processing of skewed dataset is described, in accordance with an embodiment of the present subject matter. The method 400 may be described in the general context of computer executable instructions. Generally, computer executable instructions can include routines, programs, objects, components, data structures, procedures, modules, functions, etc.. that perform particular functions or implement particular abstract data types.

The order in which the method 400 for processing skewed dataset is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof However, for ease of explanation, in the embodiments described below, the method 300 may be considered to be implemented in the above described system 102.

At block 401, the processor is configured to capture, a broadcast size of the non-skewed datasets to be loaded onto a memory associated with one or more nodes in the distribution system. The broadcast size is captured from at least one of configuration file, or command line option or another computer-based system with a graphical user interface.

At block 402, the processor 302 is configured to identify by the identification module 312, the skewed dataset from two or more datasets to be joined at the node. The dataset comprises at least one of a non-skewed dataset and the skewed dataset. The skewed dataset is the larger dataset in a set of two datasets to be joined. The identifying comprises detecting the skewed dataset based on data distribution on joining keys used for joining the two or more datasets. The data distribution is calculated by using any predefined methodology.

At block 404, dividing of each of the non-skewed dataset into a plurality of non-skewed data chunks is done by the processor 302 through the dividing module 314 at the node. Each of the non-skewed data chunk comprises the broadcast size chunk.

At block 406, broadcasting, of each of the non-skewed data chunk to one or more nodes having the skewed dataset is done by the processor 302 through the broadcasting module 315 at the node. The one or more nodes are used for performing joining operation of the two or more datasets. The broadcasting comprises one of a serializing each of the non-skewed data chunks, or deserializing each of the non-skewed data chunks on each node of the one or more nodes.

At block 408, performing, the joining operation between each of the skewed dataset and the non-skewed data chunk is done by the processor 302 through the joining module 316 over each of the node. The joining operation is done for the skewed and non-skewed dataset chunk that is received as a result of the broadcasting, for obtaining a resultant joint dataset At block 410, storing of each of the resultant joined dataset over each of the node, is done by the processor 302 through the storage module 318. Each of the broadcasting and the performing of the joining operation are repeated till a last chunk of the non-skewed dataset is joined with the skewed data.

At block 411, the processor 302 collects the resultant joined dataset as a single joined dataset from the nodes involved in the joining operation through the capturing module 220.

Although implementations for system and method for processing skewed dataset have been described in language specific to structural features and/or methods, it is to be understood that the appended claims are not necessarily limited to the specific features or methods described. Rather, the specific features and methods are disclosed as examples of implementations for processing skewed dataset.

The invention claimed is:

1. A method of processing skewed datasets in a distributed computing environment, the method comprising:
    capturing, at a first node, a broadcast size of non-skewed datasets to be loaded onto a memory associated with one or more other nodes in a distributed system;
    identifying, at first node, a skewed dataset from two or more datasets to be joined, wherein the dataset comprises one or more non-skewed datasets and the skewed dataset;
    dividing, at the first node, each of the non-skewed datasets into a plurality of non-skewed data chunks, wherein each of the non-skewed data chunks comprises a broadcast size chunk, wherein the broadcast size defines a maximum size of the non-skewed data chunk;
    broadcasting, at the first node, each of the non-skewed data chunks to one or more other nodes having the skewed dataset, wherein the one or more other nodes are used for performing joining operation of the two or more datasets;
    performing, over each of the one or more nodes, the joining operation between each of the skewed dataset and the non-skewed data chunks received as a result of the broadcasting, for obtaining a resultant joined dataset;
    storing, each of the resultant joined dataset over each of the one or more nodes, wherein each of the broadcasting and the performing of the joining operation is repeated till skewed dataset is joined with the non-skewed data chunk; and
    collecting, from the one or more nodes involved in the joining operation, the resultant joined dataset as a single joined dataset.

2. The method as claimed in claim 1, wherein the skewed dataset is a larger dataset in a set of two datasets to be joined.

3. The method as claimed in claim 1, wherein the identifying comprises detecting the skewed dataset based on data distribution on joining keys used for joining the two or more datasets, wherein the data distribution is calculated by using any predefined methodology.

4. The method as claimed in claim 1, comprising:
    capturing, a broadcast size of the two or more datasets to be loaded onto a memory associated with one or more other nodes in the distribution system, wherein the broadcast size is captured from at least one of configuration file of the one or more datasets, or command line option or from another computer based system.

5. The method as claimed in claim 1, wherein the broadcasting comprises of a serializing each of the non-skewed data chunks, transmitting the data chunk to all the nodes and deserializing each of the non-skewed data chunks received on each node of the other nodes.

6. A system processing skewed datasets in a distributed computing environment, the system comprising:
a memory; and
a processor coupled to the memory, wherein the processor is configured to execute a set of instructions stored in the memory, wherein the processor is configured to:
capture, at a first node, a broadcast size of non-skewed datasets to be loaded onto a memory associated with one or more other nodes in a distributed system;
identify, at the first node, a skewed dataset from two or more datasets to be joined, wherein the dataset comprises one of a one or more non-skewed datasets and the skewed dataset;
divide, at the first node, each of the non-skewed dataset into a plurality of non-skewed data chunks, wherein each of the non-skewed data chunks comprises a broadcast size chunk, wherein the broadcast size defines a maximum size of the non-skewed data chunk;
broadcast, by the first node, each of the non-skewed data chunks to one or more other nodes having the skewed dataset, wherein the one or more other nodes are used for performing joining operation of the two or more datasets;
perform, over each of the one or more nodes, the joining operation between each of the skewed dataset and the non-skewed data chunk received as a result of the broadcasting, for obtaining a resultant joint dataset; and
store, each of the resultant joint dataset over each of the one or more nodes, wherein each of the broadcasting and the performing of the joining operation is repeated till a last skewed dataset of one or more skewed datasets is joined with the non-skewed data chunk,
collect, from the one or more nodes involved in the joining operation, the resultant joined dataset as a single joined dataset.

7. The system as claimed in claim 6, wherein the skewed dataset is a larger dataset in a set of two datasets to be joined.

8. The system as claimed in claim 6, wherein the processor is configured to:
detect, the skewed dataset based on data distribution on joining keys used for joining the two or more datasets, wherein the data distribution is calculated by using a predefined methodology.

9. The system as claimed in claim 6, wherein the processor is configured to:
capture, a broadcast size of the two or more datasets to be loaded onto a memory associated with one or more other nodes in the distribution system, wherein the broadcast size is captured from at least one of configuration file of the one or more datasets, or command line option of the one or more datasets.

10. The system as claimed in claim 6, wherein the broadcasting comprises one of a serializing each of the non-skewed data chunks, or deserializing each of the non-skewed data chunks on each node of the one or more other nodes.

* * * * *